US010560519B2

(12) United States Patent
Hammadou et al.

(10) Patent No.: US 10,560,519 B2
(45) Date of Patent: Feb. 11, 2020

(54) SENSORY DATA CAPTURE AND PROCESSING FOR THE INTERNET OF THINGS (71) Applicant: VIMOC Technologies, Inc., Mountain View, CA (US)

(72) Inventors: Tarik Hammadou, New Brighton (AU); Anthony Nikola Laskovski, Palo Alo, CA (US); Aaron James Hector, Santa Clara, CA (US)

(73) Assignee: VIMOC Technologies, Inc., Mountain View, CA (US)

( * ) Notice: Subject to any disclaimer, the term of this patent is extended or adjusted under 35 U.S.C. 154(b) by 2 days.

(21) Appl. No.: 15/611,691

(22) Filed: Jun. 1, 2017

(65) Prior Publication Data

US 2017/0353542 A1 Dec. 7, 2017

Related U.S. Application Data (60) Provisional application No. 62/345,724, filed on Jun. 3, 2016.

(51) Int. Cl.
*H04L 29/08* (2006.01)
*H04L 29/06* (2006.01)
(Continued)

(52) U.S. Cl.
CPC .......... *H04L 67/1008* (2013.01); *H04L 67/42* (2013.01); *G06F 9/505* (2013.01); *G06F 12/0813* (2013.01)

(58) Field of Classification Search
CPC ..... H04L 67/1008; H04L 67/42; H04L 67/34; H04L 67/303; H04L 67/125; G06F 9/505; G06F 12/0813
See application file for complete search history.

(56) References Cited

U.S. PATENT DOCUMENTS 9,696,721 B1 7/2017 Myers et al.
2013/0262059 A1\* 10/2013 Grbovic ................. G06Q 10/04
703/6

(Continued)

OTHER PUBLICATIONS

"neuBox, The Data Utility Computing Node", Vimoc Technologies, www.vimoc.com, Jun. 13, 2016, 6 pages.

(Continued)

*Primary Examiner* — Michael A Keller
(74) *Attorney, Agent, or Firm* — Haynes Beffel & Wolfeld LLP (57) ABSTRACT The disclosed systems and methods include configuring a model to process incoming sensor data from a multitude of sensors in a custom sensor network—accessing domain-specific, vendor-specific, and technology-specific sub-models and selecting and combining features of the sub-models in an object that accepts incoming data from the sensors. Also included are classifying and selecting a domain-specific sub-model based on the classification; determining a vendor and selecting a vendor-specific sub-model for the sensors; classifying a sensor technology and selecting a technology-specific sub-model based on the classification of the sensor; automatically configuring alerts and basic data handling by a sensor controller; automatically configuring storage objects used by the sensor controller to persist the data from the sensors as it is received and parsed; and testing the alerts, basic data handling and storage object persistence with the sensors or simulated sensors to confirm operable configuration of the sensor controller.

12 Claims, 6 Drawing Sheets (51) Int. Cl.
*G06F 9/50* (2006.01)
*G06F 12/0813* (2016.01)

(56) References Cited

U.S. PATENT DOCUMENTS

2014/0266801 A1* 9/2014 Uppal .................... G08G 1/144
340/932.2
2017/0234053 A1 8/2017 Myers et al.

OTHER PUBLICATIONS

Szegedy, "Going deeper with convolutions", arXiv:1409.4842v1, [cs.CV], pp. 1-12, Sep. 17, 2014.
Simonyan, Very Deep Convolutional Networks for Large-Scale Visual Recognition, Visual Geometry Group, Department of Engineering Science, University of Oxford, http://www.robots.ox.ac.uk/-vgg/research/very_deep/, Sep. 7, 2017, pp. 1-3.
Simonyan, "Very Deep Convolutional Networks for Large-Scale Image Recognition", Visual Geometry Group, Department of Engineering Science, University of Oxford, karen,az@robots.ac.uk, arXiv:1409.1556v6, [cs.CV], published as a conference paper at ICLR, Apr. 10, 2015, pp. 1-14.
"Bike/Pedestrian Detection", VIMOC, Mountain View, CA 94040, www.vimoc.com, Jul. 3, 2017, pp. 1-2.
"Smart Parking Solutions, Parking Garage Occupancy Management", VIMOC, Mountain View, CA 94040, www.vimoc.com, Jul. 3, 2017, pp. 1-2.
"Smart Parking Solutions, Individual Space Detection", VIMOC, Mountain View, CA 94040, www.vimoc.com, Jul. 12, 2017, pp. 1-2.
"Crosswalk Pedestrian Detection", VIMOC, Mountain View, CA 94040, www.vimoc.com, Jul. 3, 2017, pp. 1-2.

* cited by examiner

SENSORY DATA CAPTURE AND PROCESSING FOR THE INTERNET OF THINGS

RELATED APPLICATIONS

This application claim priority to and the benefit of U.S. Provisional Application No. 62/345,724, titled SENSORY DATA CAPTURE AND PROCESSING FOR THE INTERNET OF THINGS, filed Jun. 3, 2016. The priority application is incorporated by reference herein.

BACKGROUND

Computer software has been written for serial computation. To solve a problem, an algorithm is constructed and implemented as a serial stream of instructions. These instructions are executed on a central processing unit on one computer. Only one instruction may execute at a time. After that instruction is finished, the next is executed.

Parallel computing, on the other hand, uses multiple processing elements simultaneously to solve a problem. This is accomplished by breaking the problem into independent parts so that each processing element can execute its part of the algorithm simultaneously with the others. The processing elements can be diverse and can include resources such as a single computing engine with multiple processors, several networked computing engines, specialized acceleration hardware, or any combination of the above. The result is an increase in efficiency and speed of processing.

There are several inefficiencies in the current parallel-computing-systems-related IoT architecture. IoT computing systems typically require the use of application software that is downloaded on node computing system micro servers within a cloud computing architecture in a data center to achieve efficient workload and sustain the huge amount of data generated from sensory data. For example Kinesis Amazon Web Services rely on HW micro servers and hardware accelerators within the data center to achieve an efficient throughput. The infrastructure receives raw data from different type of sensors and databases. The growth for data generated from IoT sensors will put huge pressure on the HW infrastructure and generate a high level of software complexity. IoT deployments will generate large quantities of data that most need to be processed and analyzed in real time. Processing large quantities of IoT data in real time will increase as a proportion of workloads of data centers, leaving providers facing new security, capacity and analytics challenges.

Large-scale applications like smart cities involving millions of sensors will lead to software complexity and high cost of management. Furthermore, parallel processing architecture within data centers is complex and inefficient requiring high cost of software and operational management. This is due to the lack of computational model, and compilers for parallel processing that are not mature.

SUMMARY

The disclosed technology includes a service-based model for distributed acquisition and processing of sensory data: a combination of a modular approach to modelling data and a fully service-oriented approach to composing system functionality allows rapid development and an extremely high level of code reuse. The fact that services may be deployed on any node in the system leads to a high level of distribution.

Also disclosed is a system for aggregation of services and data into node capabilities, and "shadowing" of these capabilities.

Additionally, the disclosed service discovery and selection make possible querying within a mesh of nodes, using a White Pages service discovery mechanism to identify by IP addresses and a Yellow Pages service discovery mechanism for identifying IoT nodes by the services they provide.

DETAILED DESCRIPTION

Certain embodiments relate to Internet of Things ("IoT")-related data computing systems. More specifically, certain embodiments relate to a method and system for sensory data distributed processing at the edge of the network. Particular embodiments describe a landscape computing system and architecture that uses code/programming embedded in node computing engines to distribute IoT landscape programming.

Scale-out workload data centers include breaking the data into small segments and distributing it over different processors. The struggle for capacity and power density within data centers motivates the use of micro servers and computing accelerators. However, the existing architecture, computational model, and software architecture do not efficiently address the problem related to large-scale IoT applications.

The amount and type of IoT information differs than other sets of big data that comes from social media, for example, in the following ways:
  It tends to arrive as a steady stream and at a steady pace, although it can arrive in batches like test logs that can be processed and passed on straight away.
  It comes in very large quantities and accumulates very fast.
  The real value can only be uncovered using analytics
  It is rarely used for production purposes
  It is deleted very quickly, unless it is needed for compliance reasons but in intelligence is stored and more valuable.

Centralized data centers or clouds are the main platform for data-intensive computing. This is because clouds such as Amazon AWS and Microsoft Azure offer large amounts of monetized co-located computation and storage that is well suited to typical processing tasks such as batch analytics. However, many big data applications rely on data that is geographically distributed, and is not collocated with the centralized computational resources provided by clouds. Examples of such applications include data collected from distributed instruments and sensors.

IoT applications lead to a number of challenges for efficient data analytics in today's cloud platforms.

In some applications like video, data is both large and widely distributed and data upload may constitute a non-trivial portion of the execution time.

Data upload, coupled with the high overhead in instantiating virtualized cloud resources, further limits the range of applications to those that are either batch-oriented or long-running services.

The cost to transport, store and process data may be outside of the budget of the small-scale application designer or end-user.

The use of edge-distributed computing is attractive for two reasons:

IoT applications relying on distributed data have characteristics suitable for making the edge attractive. This is the case for large amounts of processing for video and radar, and for fusion of sensors (e.g., filtering and aggregation) which can be done independently at the edge—which yields significant data compression, thereby reducing the data movement costs for any subsequent centralized processing.

Computation at the edge is highly efficient today with the provision of powerful multi-core, multi-node computing machines.

Particular embodiments describe a novel computational model for sensory data capture and processing, referred to herein as "landscape computing." Landscape computing is a special type of parallel computing designed and optimized for IoT applications which relies on wireless or wired connected low power computing engines (with on board CPU, storage, power supply, network interface, etc.) forming a mesh network of computing engines and connected to a network (private, public or the Internet) by a conventional network interface, such as broadband. The landscape computing mesh network is connected to a sensory network by conventional low power wireless interface, such as ZigBee and Bluetooth.

Landscape computing is a form of distributed computing whereby a "super- and virtual computer" is created from networked, loosely coupled low power computing engines acting in concert to perform very large tasks related to real time sensory data and IoT applications. Such arrangements permit handling of data and computations at the edge of the network in real time that would otherwise require the power of expensive cloud computing and communication infrastructure or would have been impossible to achieve.

One advantage of particular embodiments may be that each individual computing engine, when utilized as a "node," is embedded within the environment/infrastructure around an office, home, business, street or farm. Combining multiple nodes can produce computing resources similar to a multiprocessor supercomputer, but at lower cost and enabling ambient intelligence resources.

The high-end scalability of geographically dispersed landscape computing networks is generally favorable, due to the efficient connectivity between nodes and sensory networks relative to the capacity of the public cloud conventional data center parallel processing. There are also some differences in programming and deployment. It can be costly and difficult to write programs so that they can be run in the environment of a data center parallel processing infrastructure, for large scale IoT real-time sensory data.

If a problem can be adequately parallelized, a "thin" layer of "grid" landscape computing infrastructure can allow conventional, standalone programs to run on multiple landscape computing engines and each given a different part of the same problem. This makes it possible to write and debug on a single conventional machine, and eliminates complications due to multiple instances of the same program running in the same-shared memory and storage space at the same time.

Another aspect of particular embodiments includes distributed computing principles and is inspired by human networks. A human network includes sophisticated abstractions and complex patterns for individuals to collaborate together and accomplish a common objective. The human network is intelligent because they accomplish their goals in multiple ways using information collected from the external world and using the information to control the external world. The effectiveness of the human network depends on the connections, communication and specialization of the individual human object. Organization consists of connected "agents" accomplishing results that are better than if they were not connected. An organization establishes goals, segments the goals into separate activities to be performed by different agents and activities to accomplish the overall goals. Scalability is accomplished through hierarchical segmentation of activities and specialization. Cost is based on the cost of coordination of the agents and economies of scale obtained from increasing the network size, which defines the nature of the connected network.

Another aspect finds its inspiration from the plain old telephone service (POTS) with an objective of connecting billions of humans anywhere, any time at reasonable cost. It provided the necessary managed infrastructure to create the voice dial tone, deliver it on demand and assure the connection to meet varying workloads and individual preferences with high availability, optimal performance and end-to-end connection security.

Particular embodiments may describe a distributed computing method. Particular embodiments may consist of providing a framework for executing programs using a distributed mechanism.

Particular embodiments may be based on a heterogeneous, service-oriented distributed processing scheme where individual tasks are assigned to nodes based on which node has access to the data required for the task.

Service-oriented distributed architectures are architectures that make computing services available as independent services that can be accessed without knowledge of their underlying platform implementations.

Designing a distributed computing architecture is a challenging task. In the context of IoT, each computing node may have its own local data and interfaces. Particular embodiments may turn this challenge into an advantage, leveraging the existing tools and techniques available from multi-agent software engineering to deliver an effective solution, while introducing novel innovations inspired by the human network organization and the plain old telephone service (POTS).

Particular embodiments may provide:

A novel framework for data collection and processing at the edge of the network. The framework may comprise a number of elements, which together allow for efficient processing of large volumes of sensory data, while minimizing the volume of data traffic on the network.

A system and method for IoT computing using landscape computing architecture consisting of a low power mesh computing architecture connected to a layer of sensory networks are disclosed herein.

A method for an IoT computing model comprising receiving a data component request from a node of computing engines of a landscape computing system. The request indicates that the node-computing engine is configured to process the data component as a part of the landscape computing system. A data component is shared to the node-computing engine in response to the request. The data component is configured to be processed by a landscape computing system-processing program executing in the node-computing engine.

An IoT service implementation method comprising the steps of: the superordinate IoT service platform providing management for one or more of subordinate IoT service platform, special service platform and service gateway, wherein the management includes one or more of: (1) registration, (2) login, (3) logout, (4) data synchronization and (5) heartbeat.

A method of sensory data distributed processing where each program consists of a script, with a number of distributed processing tasks, each with well-defined inputs and outputs.

A method where tasks are mapped to services, made available by nodes on a given nBox mesh. These services are defined in service definition modules, which can be uploaded to nodes at runtime. Each node provides services, based on their local data and the capabilities of the node.

Figure 1:
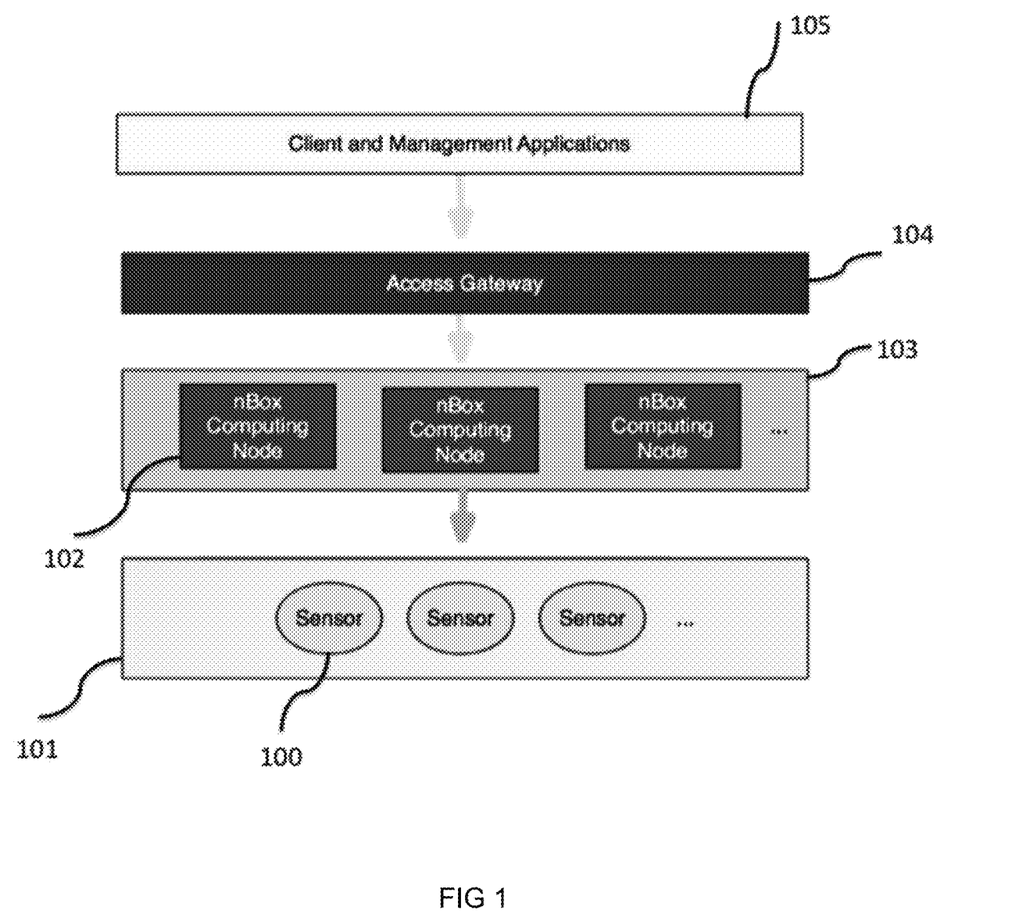
FIG. 1 illustrates the architecture of particular embodiments of a landscape computing platform.

FIG. 1 illustrates the architecture of particular embodiments of a landscape computing platform. A landscape computing architecture may provide a novel framework for data collection and processing at the edge of the network. It may comprise a number of elements, which together allow for efficient processing of large volumes of sensory data, while minimizing the volume of data traffic on the network. As illustrated in FIG. 1 the layers are as follows:

Sensors and effectors layer 101: A sensor 100 is any form of device that provides an input to the system, based on data sourced from the environment, or from an external system. An effector is any device that can effect change on the environment (or an external system) in response to an event. This could be a display or lighting control. The sensors and effectors layer 101 can be combination of any type of sensors like: radar sensors, imagining, acoustic, location based sensors. The sensors and effectors layer can be fixed or can be part of a mobile sensory network like vehicles, wearable electronics or any type of mobile platform like a mobile phone.

nBox Computing Node Mesh layer 103: Unlike traditional models of computation, where compute power is generally concentrated in the data center, the landscape computing architecture provides support for a rich computing model at the edge of the network. This layer includes the computing devices, called nBoxes 102 that capture sensory data, handle events, and perform processing at the network edge.

Access Gateway 104: The access gateway is connected to the nBox mesh layer 103 by one or more encrypted Internet tunnels. This provides data connectivity to the nBox mesh layer 103 for sending and receiving data, management, and discovery. It may also be used as a storage tier for data that needs to be accessed centrally (for performance or aggregation reasons), and for caching data to improve response times. Access gateway 104 provides a robust API to allow developers to rapidly create applications that make use of the nBox mesh layer 103.

Client and Management Applications 105: These are the applications that use the landscape computing architecture illustrated in FIG. 1, either for management of the system, or as an end-user application for a specific area.

At a high-level view, the landscape computing architecture can be seen as being comprised of four distinct layers, which together provide efficient, robust access to data. The landscape computing architecture illustrated in FIG. 1 can handle deployments of large numbers of sensors 101 in an efficient manner. To facilitate ease of management, sensors are grouped into logical collections, according to their geographical location. There are two main concepts used for these groupings: sites and zones.

A site is a large-scale grouping collection of sensors, corresponding to a city, campus, parking station or other location. Each site typically has its own individual management and reporting, along with a distinct user-interface instance. Each site is composed of a number of zones. These are smaller groupings, consisting of, at most, a few dozen sensors. Each zone corresponds to an individual cluster of sensors, in a well-defined geographical area.

A typical deployment involves selecting a site for deployment of the system, determining the sensor types to be used, segmenting that site into logical zones for ease of management, and deploying sensors 101 and nBoxes 102 into these zones as required.

The nBox 102 architecture is extensible, and can be enhanced once deployed by adding additional Capability Modules. These add support for integration with additional sensor types, additional data representations, additional processing options, or a combination of each.

Management functionality allows for redundancy and aggregation in the deployment of sensors. Sensors exposed by the end-user API are "virtual" sensors, queried from individual physical sensors connected to nBoxes 102 located on the landscape mesh layer 103. Each sensor 101, as seen by the API may actually correspond to a number of physical hardware sensors, with sensor processing being done on the "network edge" by nBoxes 102 to provide more accurate, intelligent real-time data. Each zone and sensor can be queried to provide information, whether it be stored data, or calculated results.

A physical sensor ID is defined in terms of an nbox ID and a sensor ID, e.g. 'nbox001_13'. A virtual sensor mapping is defined in terms of a site, zone and virtual sensor id, e.g. 'pa_1_4'.

The purpose of landscape computing architecture illustrated in FIG. 1 is twofold. Firstly, it provides a robust architecture for efficiently capturing information from sensors 100 and driving changes to the environment via effectors. Secondly, it provides a novel architecture for distributed computing at the network edge. These two attributes are synergistic, as the advanced processing capabilities enabled by the system allow for a greatly reduced network load, driving further network efficiencies.

The nBox landscape computing mesh layer 103 can be applied to city infrastructure and installed on light poles or within a home or a building infrastructure as near edge access gateways. Sensor acquisition is performed in the system via a wired, wireless or Internet connection from an individual nBox computing node 102 to a data acquisition device. This may, for example, be an Ethernet connection to a specialist data concentrator for a specific sensor type, a direct ZigBee connection (over GPIO) to a set of sensors, or a connection to a specific Internet Web Service. Control of effectors is similarly done via a connection to a data output device via wired, wireless or Internet means. When an event is triggered, this connection is used to update the device.

One of the most challenging aspects of designing any distributed computing architecture is the mechanism for sharing workload across the nodes in the system.

While the landscape computing architecture of FIG. 1 provides a robust mechanism for data capture, a more exciting application is the generation of true intelligence at the network edge. Particular embodiments present a framework for distributing processing and learning across the network.

The landscape computing architecture of FIG. 1 provides a different platform, in which each node has its own local data, local interfaces, and where communication speeds among nodes may differ based on physical location. Particular embodiments and method takes advantage of this heterogeneity, so rather than it being an impediment to processing, it becomes an advantage to be leveraged. The present method and architecture can be found in the theory of Agent-Oriented Software Engineering and Service-Oriented Architectures. The basis of this approach is for each nBox Computing Node 102 to offer a number of "services", based on its computing capability and its locally available data. These services are delivered to other nodes within the mesh layer 103 by interfaces running on each Computing Node 102. Higher-level functionality within the system is delivered by aggregating these services to provide larger sets of functionality.

This novel architecture presented in FIG. 1 strikes a balance between the heterogeneity inherent to IoT systems, and the homogeneity of cluster-based approaches.

The disclosed technology includes a method of composing a distributed sensory data acquisition and processing system from well-defined services. These services encapsulate operations on individual processing nodes and provide an aggregation mechanism for composing broader system functionality. Individual services fall into one of three categories:

Result-based services: stateless services that perform a well-defined processing task and return a result (that is, a service that accepts a data frame and extracts information from it).

Subscription-based services: stateful services that perform operations and return results at regular intervals (that is, a service that keeps track of the current processing load on a node and returns the average load every minute).

Event-based services: stateful services that monitor for a particular condition, and trigger when that condition occurs (that is, a service that monitors temperature and triggers an alert when it reaches a particular threshold).

System functionality is encapsulated within services falling into one of these three categories. All three categories may send and receive messages. These messages services follow well-defined FIPA Interaction Protocols: http://www.fipa.org/repository/ips.php3—including Request Interaction Protocol, Subscribe Interaction Protocol, and Recruiting Interaction Protocol. Through these interactions, broader system functionality is aggregated.

Broader functionality is created through composition of services. A composite service may be formed by utilizing a number of existing lower-level services to provide broader functionality. For example, an event-based composite service may perform data acquisition and processing in the following manner:

Notification that a new frame of data has arrived by an event-based service (that is, a new reading from a proximity sensor on a parking space).

Using a result-based service to extract relevant data attributes from this data frame (that is, the new distance to the monitored object).

Passing these data attributes to another event-based service, which maintains state for all parking spaces.

Receiving a notification from the event-based service of a change in occupancy based on the new distance reading.

Triggering an event, resulting in actuation of the light on the parking space.

These composite services can then be aggregated into higher-order composite services, with this iterative composition forming the broader system functionality.

When communicating sensory data between services, a model or ontology needs to be used to ensure that there is a common method for describing information sensed from the system's environment. Each model consists of a number of "sub-models", that fall into one of three categories:

Domain-specific sub-models: cover the domain for which the sensory data is relevant, regardless of how that data was acquired. For example, a "single-space occupancy" sub-model contains parking space occupancy information, regardless of whether it was obtained from a proximity sensor, a radar sensor, or a vision-based occupancy system.

Vendor-specific sub-models: these include information specific to a vendor. This allows vendor-specific functionality and versioning information to be modelled without the need to include this information in the sensor-agnostic domain-specific model.

Technology-specific sub-models: these include specific functionality for particular technology attributes. For example a "battery operated" sub-model will include information on current voltage and expected voltage. A "wireless" sub-model will include information related to signal strength and signal to noise ratio.

Information from a sensor is generally composed of a single domain-specific sub-model, a single vendor-specific sub-model, and a number of technology-specific sub-models. For example, a battery-operated, wireless, proximity-based parking sensor from "XYZ Labs" may be modelled with the following composition of sub-models:

Single-Space Occupancy (Domain-Specific)
"XYZ Labs-A-Series" (Vendor-Specific)
Battery-Operated (Technology-Specific)
Wireless (Technology-Specific)

Figure 5:
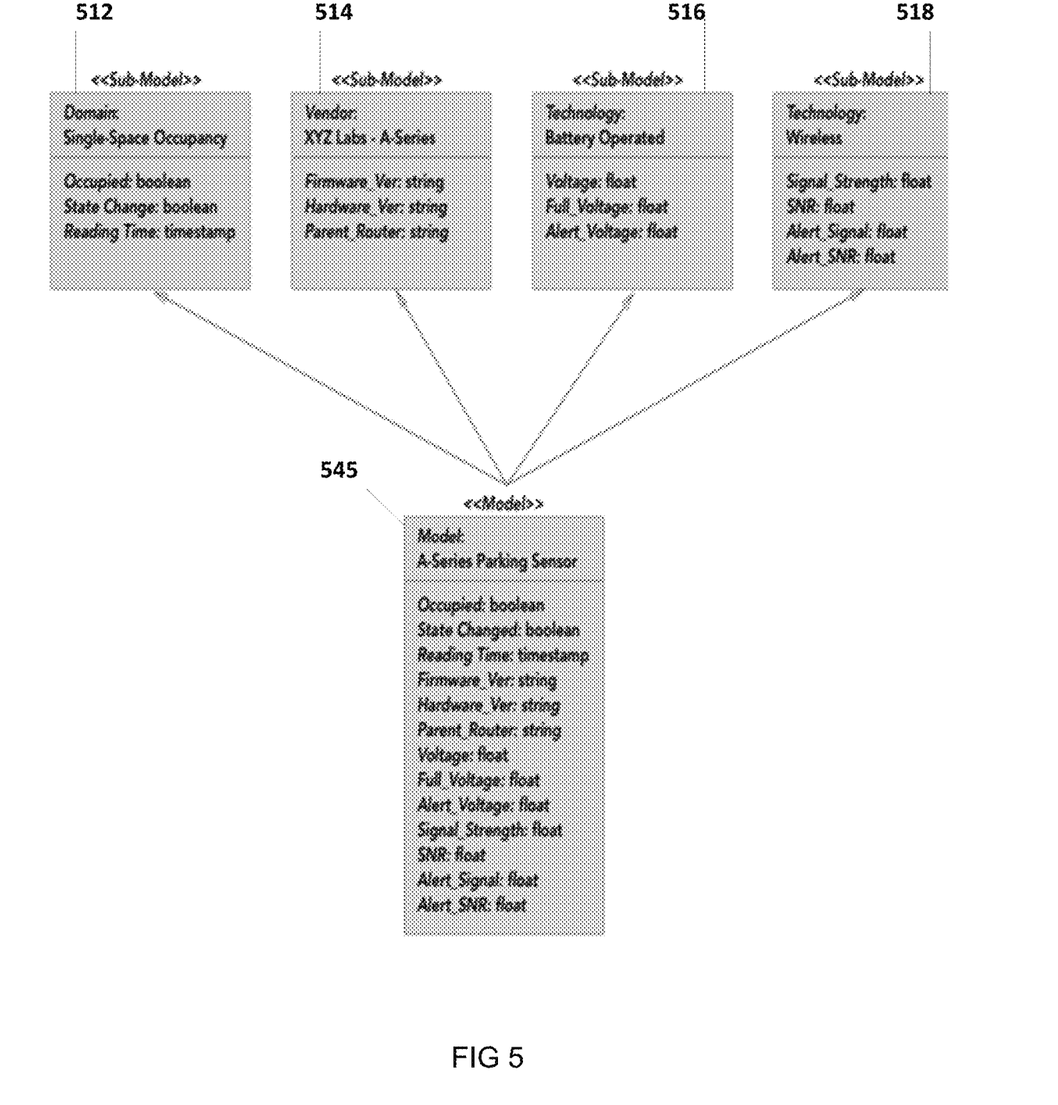
FIG. 5 illustrates an example of the composition of the model from domain, vendor and technology sub-models.
Figure 6:
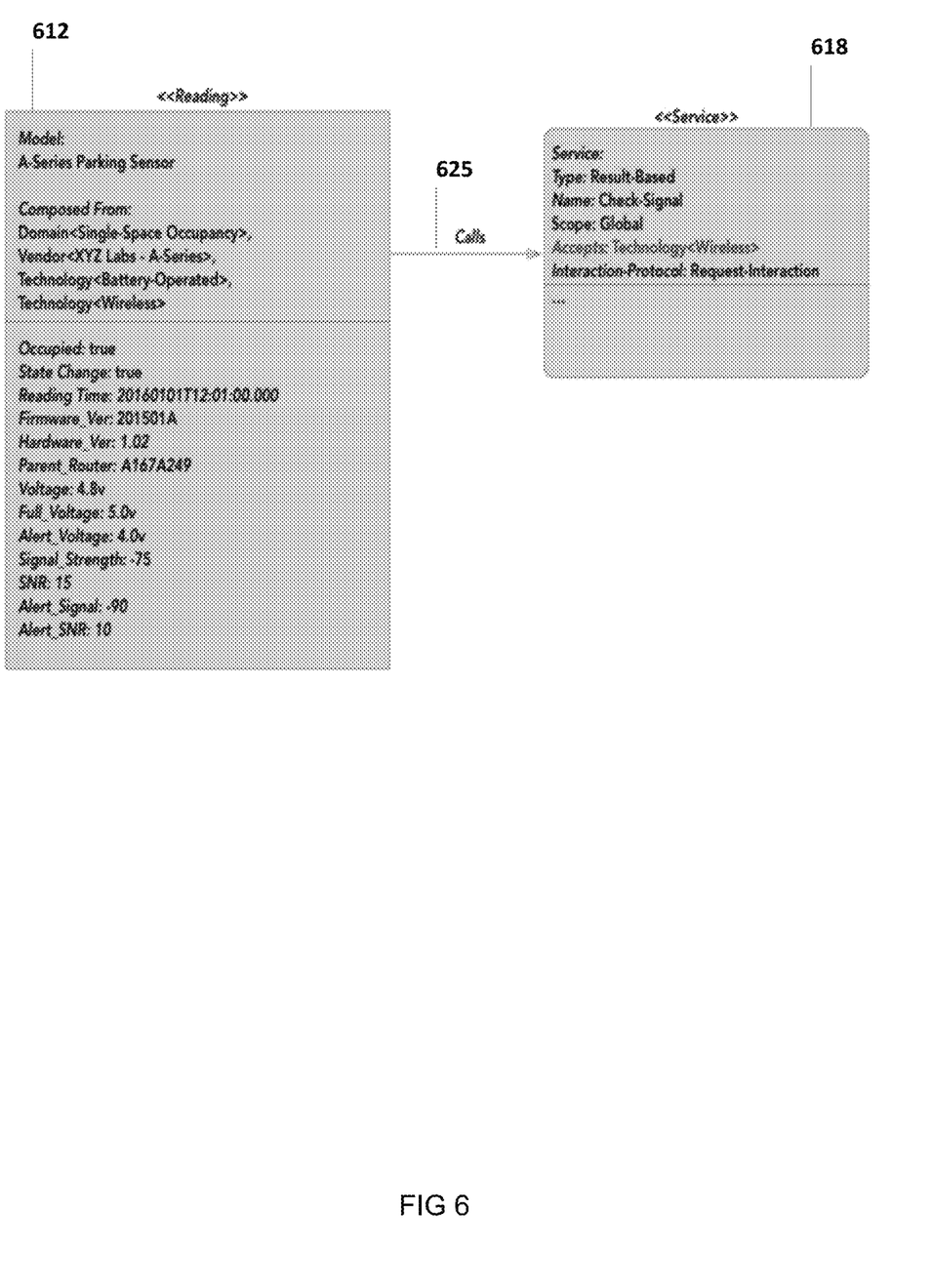
FIG. 6 shows a use case example reading for the example A-Series Parking Sensor.

FIG. 5 shows an example of the composition of the model from domain, vendor and technology sub-models: single-space occupancy 512 as domain-specific sub-model, XYZ Labs 514 as vendor sub-model, battery-operated 516 as technology-specific sub-model, and wireless 518 as technology-specific sub-model for the model a-series parking sensor 545 example. FIG. 6 shows a use case example reading 612 for the example A-Series Parking Sensor and shows calls 625 for service 618.

By composing the model in this way, the sensory data can be handled by any and all services that accept models of the included sub-type. For example, battery alerts can be triggered by generic battery monitoring services, regardless of the fact that this is a parking sensor. The parking data can be handled by the same services that handle vision-based parking sensor readings. Signal strength may be monitored by the same services that also monitor signal strength for wireless temperature sensors.

The combination of a modular approach to modelling data and a fully service-oriented approach to composing system functionality allows rapid development and an extremely high level of code reuse. The fact that services may be deployed on any node in the system leads to a high level of distribution.

The nBox edge distributed framework described relative to FIG. 1 supra provides flexible and extensible architecture for allowing data processing on the heterogeneous mesh network provided by landscape computing. We define external interfaces and internal interfaces. The external interfaces consist of: services, messages, discovery, commitments, roles, shadowing, and network connectivity.

The core of the execution framework is based around the concept of services. A service is a task that is performed by an individual nBox. Services are exposed to the landscape as a whole through a well-defined interface, encapsulating individual functionality. Services themselves may be as simple as fetching data for a given time-frame, or may be as complex as performing a machine learning operation to provide predictive data for future forecasting.

Services may be result-based, simply returning when the processing is complete; they may be subscription-based, being performed in the background on a regular basis; or may be event-based, returning a value when a given condition is evaluated to be true.

Services should be defined as specifically as possible, to allow for reuse of their functionality. Fine-grained services, such as returning particular data or calculating particular results may be used for a wide range of tasks within the system. This fine-grained processing also allows for tasks to be divided among multiple nBoxes more easily, improving the degree of parallelization within the system.

System functionality is composed through services calling other services via a message passing framework. At any time, there may be multiple processing nodes offering the required service. Services are accessed and results returned, using a message-passing interface. Each message includes the service it pertains to, the sending and receiving nBox, and details about the data representation being used. In more detail, messages are passed in accordance with a well-defined interaction pattern. These are strictly defined, for example, "publish-and-subscribe" or "request-response". The payload of the data is based on a specific, named ontology, so there can be no ambiguity in its interpretation.

Discovery of which nodes have the required service available is done through a "Yellow Pages" lookup. This involves a message to the system's directory, requesting a list of available nodes with the desired service.

The system's directory also contains information about which nodes possess data related to specific sensors, and the time ranges for which they possess that data. The directory can assist in finding the best available node for a given service call by looking at the data required, the typical processing overhead for that service request, and the load of the current nodes.

Selection of which node to call is determined by a costing mechanism based on the processing load on the node and the cost of acquiring required data (that is, if the data is not all available on the local node, a cost is associated with transferring it from another node). The weighting of these factors can be adjusted within the system to allow a balance to be struck between network utilization and even distribution of workload.

Service discovery is essential for the efficient distribution of workload across the architecture. Therefore, nBoxes within a mesh can be queried using both White Pages and Yellow Pages service discovery mechanisms.

The White Pages service allows the network address of an nBox to be determined via its unique identifier (for example, returning the address of "192.168.0.88" for the identifier "nbox017"). The Yellow Pages service allows nBoxes to be identified via the services they provide (for example, returning a list of nBoxes that can provide parking occupancy data for the past week for a given zone). Critically, these discovery mechanisms also provide calculated load statistics for each nBox, allowing services to be requested from the node with the least load at any one time. This allows for effective distribution of processing amongst the mesh.

All nBox nodes share a core subset of services, and tasks that use this shared functionality can be divided among all available nodes (with availability being determined by the current processing load on each node). However, tasks (particularly data-query tasks) that require particular data would be performed by whichever nBox has that data available locally. This allows data searching to be done at the most efficient-possible location: the source of the data. This would reduce bandwidth requirements on the mesh.

Services may be result-based, simply returning some data and having no state. However, they may also be subscription-based or event-based. These services represent a commitment to perform some form of recurrent data, whether that be a "batch processing" responsibility, such as to calculate particular results on a regular basis, a maintenance task—ensuring a particular property is kept within well-defined bounds, or an event-driven data subscription, alerting the subscribing party when a value reaches a certain level.

When an nBox requests such a service, a "commitment" is registered with the nBox it requested the service from. This is periodically refreshed, to ensure that the commitment is still required, and is still being adhered to.

Subscription-based services return regular results at a well-defined interval (defined in seconds). The result may be a calculation, or it may be simply a status message to indicate that a condition is being maintained.

Event-based services will return a result only when a condition is held to be true. For example, a service may monitor a temperature, and trigger a message when the value exceeds forty degrees. This can, in turn, trigger an internal event on the subscribing nBox.

Roles represent responsibilities that a particular nBox commits to performing within the system. Assigning a role to an nBox indicates that the nBox will provide all of the services contained within that role. Roles act a logical grouping of services, allowing closely related services to be enabled or disabled on a given nBox en masse.

The services and data available on a processing node can be grouped into capabilities: logically related collections of services, along with the data repositories they use—containing data conforming to the modeling scheme specified previously. These groupings allow rapid deployment of functionality on processing nodes. They also allow for redundancy through a feature called "shadowing". Shadowing duplicates the services and data from one processing node onto another. This is done through data replication and on-the-fly deployment of service definition modules—allowing for redundancy and increased performance, doubling the availability for the services in question. That is, shadowing is a special class of service present within the landscape computing architecture. In order to increase parallelization and availability, "shadow" capabilities can be deployed on an nBox. These capabilities simply mirror the local data and services of another nBox. In one use case example, parking data could be available from a "shadow" parking nBox that simply keeps a duplicate of the parking data, doubling its availability, and doubling the availability of computational power for this data. This shadowing can be configured to occur on the fly, by assigning it as a type of Capability Module (see below) to given nBoxes as resource demands fluctuate.

The landscape computing architecture is agnostic to the networking platform used. nBoxes may be linked via an existing wired or wireless connection, or a 3G/4G Intranet solution.

nBoxes also have the capability to be deployed in a dynamic wireless mesh network, using in-built routing algorithms to provide connectivity between all nodes, and for sharing internet connectivity within the mesh. This allows for a number of nodes to be deployed in a dispersed fashion where no existing network infrastructure exists.

The internal functionality of an nBox is comprised of two main aspects: data acquisition and manipulation, and provision of processing services to other nBoxes. These functionalities are defined in modular components, called capability modules.

In order to allow the data to be captured, or roles/services to be provided, a capability module is deployed to an nBox. For a module defining sensor integration, the following would be included as part of this module:

The scripts and/or executable required for sensor integration.
Processing framework for extracting attributes from the sensor data. This may be a simple process of parsing a data frame, or a complex process such as processing video.
A set of default filtering and tiering rules.
A set of default event rules and handlers.
Data format information for persisting data.
Definitions for relevant services, along with required scripts/executable.

Figure 2:
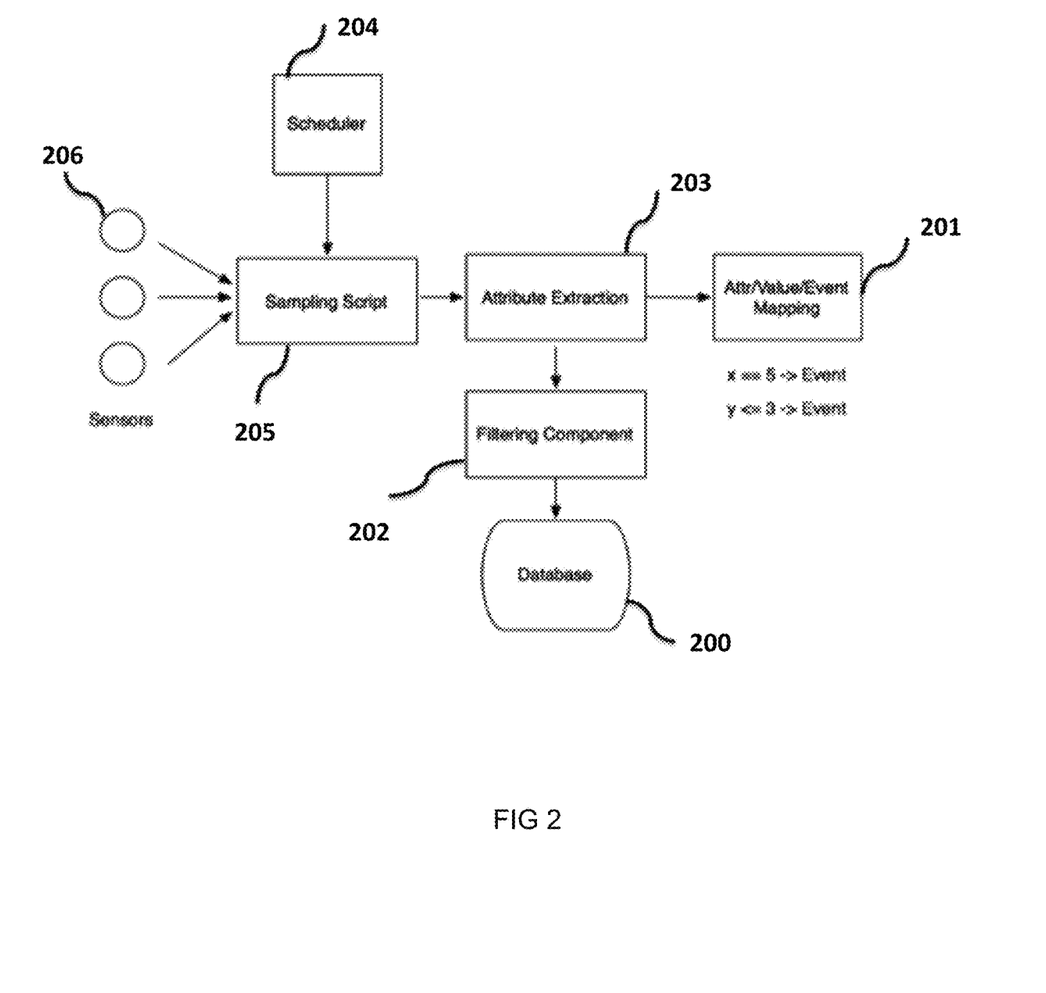
FIG. 2 illustrates the flow of data within an nBox landscape computing node.

FIG. 2 illustrates the flow of data within an nBox landscape computing node. To perform data collection, sensors 206 are integrated with nBox computing nodes by means of either wired, wireless or Internet communication. Appropriate communication channels are selected for sensory data collection based on the nature of the sensors and the volume of data produced. As illustrated in FIG. 1, data is collected by means of sensory data acquisition on the nBox computing node 102. The software for executing the task comprises:

A customizable, rules-based scheduler 204 for defining the data sampling frequency and/or policies;
An executable environment for running a modular software script or executable for sampling data from an external hardware interface (such as wireless communications device or Ethernet connection);
A database connectivity element for entering sensory data into a central data repository;
An interface to a filtering component for rejecting, transforming, and/or tiering data based on pre-defined rules.

Scheduler 204 of FIG. 2 provides functionality for defining a sampling interval for sensors, sampling commands, and recovery commands. The scheduler's startup and sampling frequency parameters allow for timing to be configured, depending on the particular application. For sensor types that provide continuous sampling of data, these parameters are irrelevant, and are set to zero, as the sampling script will always be running. The sampling command of scheduler 204 provides the actual script or executable used to integrate with the external sensor, provided by an external module. The retry command is a command to execute upon failure to read a sample, to provide for corrective behavior. The scheduler 204 is defined with the following parameters:

| Parameter | Example | Description |
| --- | --- | --- |
| Schedule Name | 'Sensor Schedule' | Identifying name for the schedule. |
| Startup Delay | 5 s | Delay, in seconds, for initiating the first reading. |
| Sampling Frequency | 60 s | Frequency to sample data. |
| Sampling Command | '{MODULE_DIR}/sample.sh' | The command to read a sample, referenced from the sensor module's root directory. |
| Retry Command | '{MODULE_DIR}/alert.sh' | The command to run upon failure when reading a sample. This may result in an alert, corrective behavior, or simply to retry. |
| Sensor Type | 'Parking' | The sensor type indicator. This is a global name used for generating attributes and tagging readings. |

As illustrated in FIG. 2, data is sampled via sampling scripts 205 defined within the scheduler configuration. These use scripts and data formats are defined as part of a capability module, to extract raw data from the sensor. This data is then passed to attribute extraction 203 for processing.

Attribute extraction 203 of FIG. 2 processes the data and identifies the relevant information that may be used within the system. Even for simple sensors, raw data received as part of the data acquisition process may include a large amount of information that is not entirely relevant to the application at hand. This could include internal diagnostic data for the sensor, routing information, data headers, etc.

For more complex sensors, such as cameras and micro radar arrays, the entire purpose of the system may be to extract information and statistics from the incoming data, rather than storing them as a whole.

Landscape computing attribute extraction 203 of FIG. 2 includes a process that allows for flexible processing of data, depending on the requirements at hand. It provides an incoming representation of raw data as an input to the relevant executable, which then extracts the attributes required, storing them as individual attribute entries. In one use case example, a parking sensor packet may be read in with the following content:

F32CDA01004B1200044FCF10C1FF5370794501004B120042105F7F018F

Attributes of attribute extraction 203 are extracted from this parking sensor packet as follows:

SENSOR ADDRESS (ID): 70794501004B1200: 00-12-4B-00-01-45-79-70: Maps to ID 22
DC ADDRESS: F32CDA01004B1200: 00-12-4B-00-01-DA-2C-F3
PARKING ROUTER ID: 4210
SIGNAL STRENGTH: 5F: 95
VOLTAGE: 7F: 3.42v
OCCUPANCY: 01: True
SERIAL NUM: 8F These extracted attributes are then transformed into a number of attribute data readings. For example, the occupancy statistics above would be represented as follows:

| Parameter | Example | Description |
| --- | --- | --- |
| Sensor ID | 'pa_1_nbox001_13' | The global sensor ID. |
| Sensor Type | 'Parking' | The sensor type indicator. This is a global name used for tagging readings |

-continued

| Parameter | Example | Description |
|---|---|---|
| Sensor Attribute | 'Occupancy' | The attribute for the reading. A single sensor type may result in individual readings of different attributes. |
| Reading ID | '123456' | ID of the reading. Generated automatically by the database, blank until insert. |
| Reading Time | '2014-11-24T18:59:16' | Reading time. Generated automatically by the database, blank until insert. |
| Reading Data | 'true' | The content of the reading. This is the main payload, and may be of any complexity. |

As illustrated in FIG. 2, once attributes are extracted, they are passed to two separate processes. In one process, filtering/tiering component 202 handles data and sends it to database 200 for storage. In the other process, attribute, value and event mapping 201 handles events as described next. The attributes identified may be evaluated against a series of rules, to trigger dynamic events. By triggering these events at the edge of the network, the system can exhibit far more responsive behavior than a system in which data is queued and then processed on a central server. This process also allows data that may not even be available to a central server to be processed at the edge.

By evaluating data according to rules-based policies, particular embodiments of landscape computing platform deliver a more responsive system, as well as reducing network load. The event handling component is a software component, comprising:

An input layer with a well-defined format for each data reading for each sensor type;

A software script that allows attributes from individual data readings to be extracted (shared with other layers of the architecture);

A flexible, rules-based engine that allows the mapping of data attribute values to system events;

The ability to trigger multiple events from a single sensor reading, based on multiple matching mappings.

Particular embodiments may repeat one or more steps of the methods described herein, where appropriate. Although this disclosure describes and illustrates particular steps of the methods as occurring in a particular order, this disclosure contemplates any suitable steps of the methods occurring in any suitable order. Moreover, although this disclosure describes and illustrates the example methods described herein, this disclosure contemplates any suitable steps for the methods, which may include all, some, or none of the steps of the example methods, where appropriate. Furthermore, although this disclosure describes and illustrates particular components, devices, or systems carrying out particular steps of the example methods described herein, this disclosure contemplates any suitable combination of any suitable components, devices, or systems carrying out any suitable steps of the methods.

Figure 3:
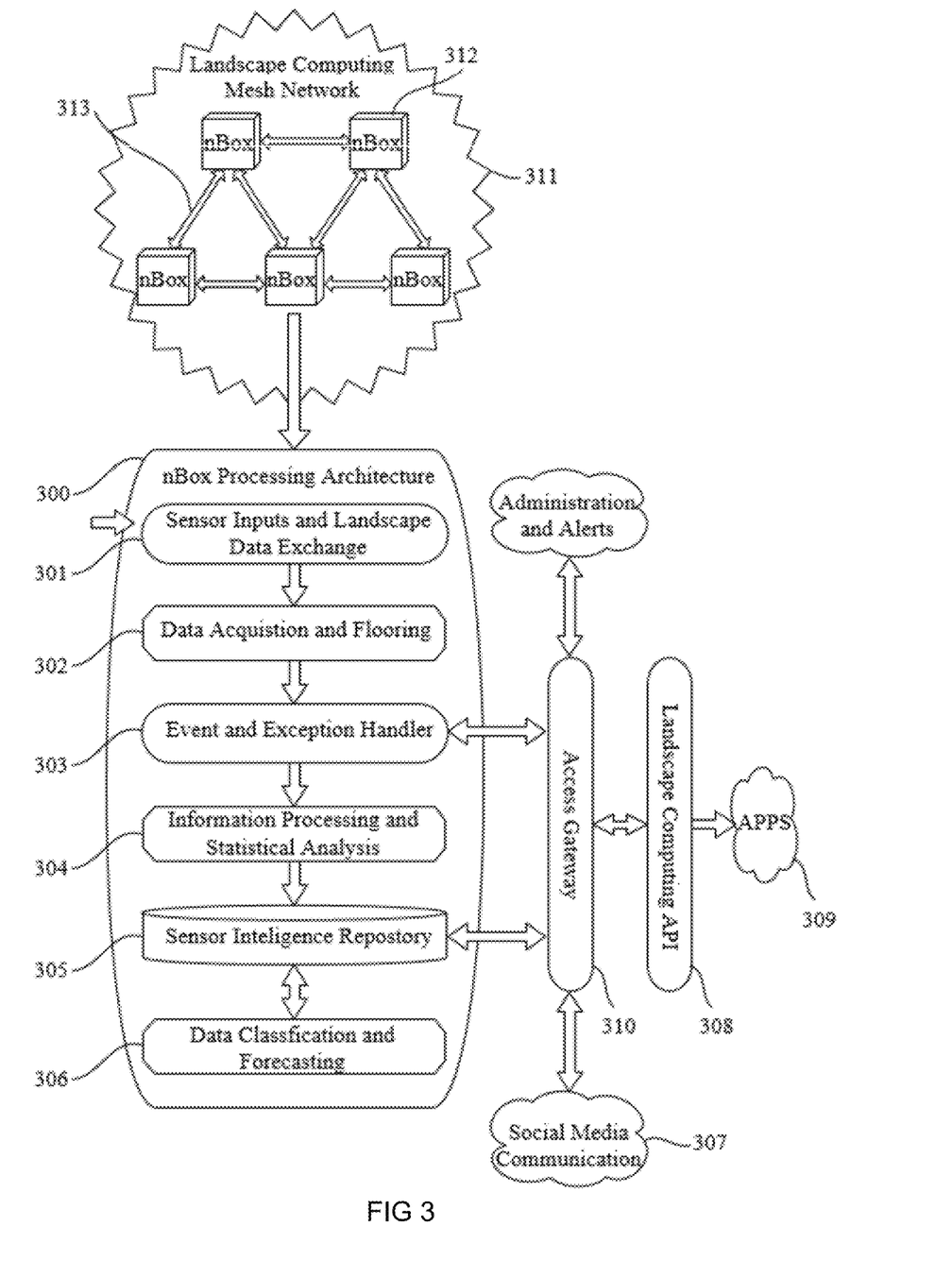
FIG. 3 illustrates functional modules for particular embodiments of a landscape computing platform.

FIG. 3 illustrates functional modules for particular embodiments of a landscape computing platform, including nBox processing architecture 300 which includes sensor inputs and landscape data exchange 301 for receiving input from nBoxes 312 with communication paths 313 between distinct nBoxes 312, in landscape computing mesh network 311. Data exchange 301 forwards data received to data acquisition and filtering 302, which processes input data and sends results to event and exception handler 303 for processing of the events and exceptions between apps 309 and nBoxes 312.

Continuing with FIG. 3, additionally included as components of nBox processing architecture 300 are information processing and statistical analysis module 304, for digesting and analyzing data received; sensory intelligence repository 305 for storing results of analysis and communicating between social media communication 307 via access gateway 310, as well as for sending and receiving intelligence to and from data classification and forecasting 306. Access gateway 310 also handles administration and alerts, with social media communication 307, and with landscape computing API 308 as an interface between nBox processing architecture 300 and apps 309.

Figure 4:
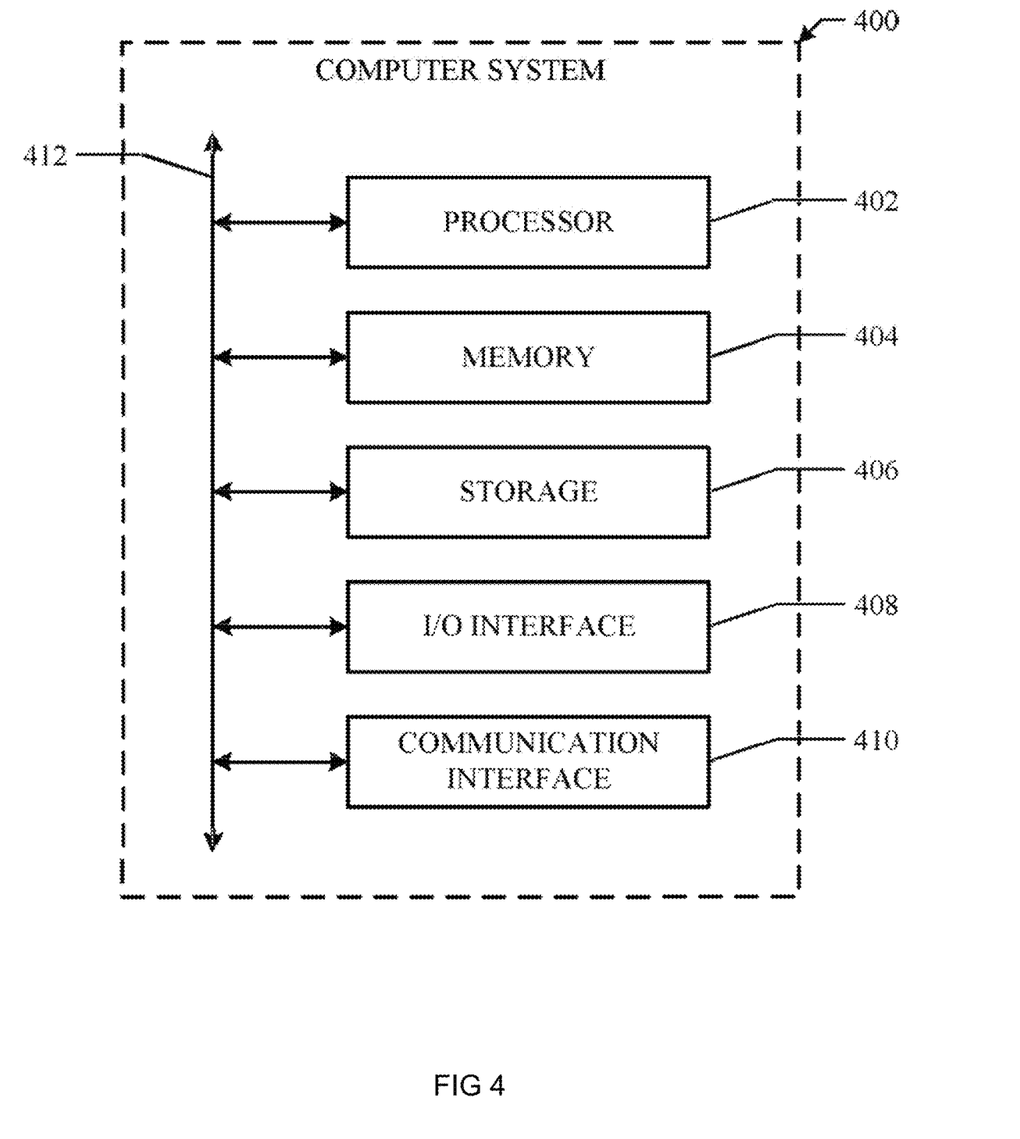
FIG. 4 illustrates an example computer system for delivering the landscape computing platform illustrated in FIG. 1.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure includes computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure includes processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, any suitable bus or interconnect may be included.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The technology disclosed can be practiced as a method of sensory data distributed processing where each computing node program consists of a script, with a number of distributed processing tasks, each with well-defined inputs and outputs.

In some embodiments, tasks are mapped to services, made available by nodes on a given computing nodes mesh. These services are defined in service definition modules, which can be uploaded to nodes at runtime.

In some embodiments, each node provides services, based on their local data and the capabilities of the node.

In some embodiments, each of the services has a well-defined set of data that is (potentially) required for its successful execution.

In some embodiments, when a task is to be executed, a relevant node is selected from the list of capable nodes, weighted according to two factors: data acquisition cost and processing load.

In some embodiments, the node with the lowest current load and the best access to the required data for the task is selected, and the relevant service executed.

A method of IoT edge distributed computing network of computing nodes wireless or wired forming a computing mesh of intelligent gateways. Each gate way is connected to a group of sensors.

In some embodiments, the mesh is continually monitored to identify bottlenecks, usually consisting of a specific service or data set which is in high demand.

In some embodiments, computing nodes resource management consists of automatically provisioning by way of "replication" or "shadow" computing, which replicates the regularly required data and the services to access.

In some embodiments, the separation of parallel computing and network management allows the end-to-end transaction management of computing tasks provided by autonomous computing nodes to be implemented as network level management.

Particular Implementations

Some particular implementations and features are described in the following discussion.

The technology disclosed for configuring a model to process incoming sensor data from a multitude of sensors (more than 20), in a custom sensor network includes accessing domain-specific sub-models, vendor-specific sub-models, and technology-specific sub-models and selecting and combining features of the sub-models in an object that accepts incoming sensor data from the multitude of sensors.

The disclosed method also includes classifying a domain in which the sensors are generating data and selecting a domain-specific sub-model based on the classification; determining a vendor of the sensors and selecting a vendor-specific sub-model for the vendor; classifying a sensor technology of the sensors and selecting a technology-specific sub-model based on the classification; and automatically configuring alerts and basic data handling by a sensor controller applicable to the data from the sensors using the selected domain-specific sub-model, selected vendor-specific sub-model, and selected technology-specific sub-model. The method further includes automatically configuring storage objects used by the sensor controller to persist the data from the sensors as it is received and parsed; and testing the alerts, basic data handling and storage object persistence with the sensors or simulated sensors to confirm operable configuration of the sensor controller.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In some implementations, the disclosed method can be applied to parking space sensors, further including classifying the domain as parking availability; determining first vendor to be the vendor of the services; classifying the sensor technology as wireless mesh; automatically configuring alerts for parking space occupied and parking space vacated based on the selected domain-specific sub-model, selected vendor-specific sub-model, and selected technology-specific sub-model; and further configuring a vacant parking space accumulator to track a number of vacated parking spaces among the multitude of sensors that report parking space events. Some disclosed implementations further include configuring parking event storage events to persist the data from the multitude of sensors that report parking space events.

Some disclosed implementations further include loading configuration data into a plurality of the sensors in the custom sensor network, based on the automatically configured alerts and basic data handling.

Yet another implementation may include non-transitory tangible computer readable storage media impressed with computer program instructions that when executed on a computer device and one or more servers, enable the tangible computer readable media to interact with a multitude of sensors (more than 20) to implement any of the methods described above. The tangible computer readable storage media does not include transitory signals.

Other implementations may include a sensor controller— including a processor and program instructions that, when executed on the processor, enable the sensor controller to interact a multitude of sensors (more than 20), in a custom sensor network, to perform any of the methods described above, the sensor controller including a processor, memory coupled to the processor, and computer instructions loaded into the memory.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of configuring a model to process incoming sensor data from a multitude of sensors (more than 20), in a custom sensor network, the method including:
   accessing domain-specific sub-models, vendor-specific sub-models, and technology-specific sub-models and selecting and combining features of the sub-models in an object that accepts incoming sensor data from the multitude of sensors, including
   classifying a domain in which the sensors are generating data as parking availability and selecting a domain-specific sub-model based on the parking availability classification;
   determining a vendor of the sensors and selecting a vendor-specific sub-model for the vendor; and
   classifying a sensor technology of the sensors and selecting a technology-specific sub-model based on the classification;
   automatically configuring alerts and basic data handling by a sensor controller applicable to the data from the sensors using the selected domain-specific sub-model, selected vendor-specific sub-model, and selected technology-specific sub-model;
   automatically configuring storage objects used by the sensor controller to persist the data from the sensors as it is received and parsed; and
   testing the alerts, basic data handling and storage object persistence with the sensors or simulated sensors to confirm operable configuration of the sensor controller.

2. The method of claim 1, applied to parking space sensors, further including:
   determining first vendor to be the vendor of the sensors;
   classifying the sensor technology as wireless mesh;
     automatically configuring alerts for parking space occupied and parking space vacated based on the selected domain-specific sub-model, selected vendor-specific sub-model, and selected technology-specific sub-model; and
     further configuring a vacant parking space accumulator to track a number of vacated parking spaces among the multitude of sensors that report parking space events.

3. The method of claim 2, further including configuring parking event storage events to persist the data from the multitude of sensors that report parking space events.

4. The method of claim 1, further including loading configuration data into a plurality of the sensors in the custom sensor network, based on the automatically configured alerts and basic data handling.

5. A sensor controller including a processor and program instructions that, when executed on the processor, enable the sensor controller to interact a multitude of sensors (more than 20), in a custom sensor network, applying a method including:
   accessing domain-specific sub-models, vendor-specific sub-models, and technology-specific sub-models and selecting and combining features of the sub-models in an object that accepts incoming sensor data from the multitude of sensors, including
   classifying a domain in which the sensors are generating data as parking availability and selecting a domain-specific sub-model based on the parking availability classification;

determining a vendor of the sensors and selecting a vendor-specific sub-model for the vendor; and classifying a sensor technology of the sensors and selecting a technology-specific sub-model based on the classification;

automatically configuring alerts and basic data handling by a sensor controller applicable to the data from the sensors using the selected domain-specific sub-model, selected vendor-specific sub-model, and selected technology-specific sub-model; and automatically configuring storage objects used by the sensor controller to persist the data from the sensors as it is received and parsed; and testing the alerts, basic data handling and storage object persistence with the sensors or simulated sensors to confirm operable configuration of the sensor controller.

6. The sensor controller of claim 5, applied to parking space sensors, further including:

determining first vendor to be the vendor of the sensors;

classifying the sensor technology as wireless mesh;

automatically configuring alerts for parking space occupied and parking space vacated based on the selected domain-specific sub-model, selected vendor-specific sub-model, and selected technology-specific sub-model; and further configuring a vacant parking space accumulator to track a number of vacated parking spaces among the multitude of sensors that report parking space events.

7. The sensor controller of claim 6, further including configuring parking event storage events to persist the data from the multitude of sensors that report parking space events.

8. The sensor controller of claim 5, further including loading configuration data into a plurality of the sensors in the custom sensor network, based on the automatically configured alerts and basic data handling.

9. One or more tangible computer readable media impressed with instructions that, when executed on a computer device and one or more servers, enable the computer readable media to interact with a multitude of sensors (more than 20), in a custom sensor network, to carry out a method including:

accessing domain-specific sub-models, vendor-specific sub-models, and technology-specific sub-models and selecting and combining features of the sub-models in an object that accepts incoming sensor data from the multitude of sensors, including classifying a domain in which the sensors are generating data as parking availability and selecting a domain-specific sub-model based on the parking availability classification;

determining a vendor of the sensors and selecting a vendor-specific sub-model for the vendor; and classifying a sensor technology of the sensors and selecting a technology-specific sub-model based on the classification;

automatically configuring alerts and basic data handling by a sensor controller applicable to the data from the sensors using the selected domain-specific sub-model, selected vendor-specific sub-model, and selected technology-specific sub-model;

automatically configuring storage objects used by the sensor controller to persist the data from the sensors as it is received and parsed; and testing the alerts, basic data handling and storage object persistence with the sensors or simulated sensors to confirm operable configuration of the sensor controller.

10. The one or more tangible computer readable media of claim 9, applied to parking space sensors, further including:

determining first vendor to be the vendor of the sensors;

classifying the sensor technology as wireless mesh;

automatically configuring alerts for parking space occupied and parking space vacated based on the selected domain-specific sub-model, selected vendor-specific sub-model, and selected technology-specific sub-model; and further configuring a vacant parking space accumulator to track a number of vacated parking spaces among the multitude of sensors that report parking space events.

11. The one or more tangible computer readable media of claim 10, further including configuring parking event storage events to persist the data from the multitude of sensors that report parking space events.

12. The one or more tangible computer readable media of claim 9, further including loading configuration data into a plurality of the sensors in the custom sensor network, based on the automatically configured alerts and basic data handling.

* * * * *